United States Patent
Hamaguchi

(10) Patent No.: US 10,870,759 B2
(45) Date of Patent: Dec. 22, 2020

(54) SILICONE RUBBER COMPOSITION FOR WATERPROOFING, SILICONE RUBBER MOLDED BODY FOR WATERPROOFING, AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Takaaki Hamaguchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 47 days.

(21) Appl. No.: 16/097,956

(22) PCT Filed: May 11, 2017

(86) PCT No.: PCT/JP2017/017862
§ 371 (c)(1),
(2) Date: Oct. 31, 2018

(87) PCT Pub. No.: WO2017/199844
PCT Pub. Date: Nov. 23, 2017

(65) Prior Publication Data
US 2019/0144672 A1  May 16, 2019

(30) Foreign Application Priority Data
May 19, 2016 (JP) ................... 2016-100206

(51) Int. Cl.
*C08L 83/04* (2006.01)
*C08K 5/01* (2006.01)
(Continued)

(52) U.S. Cl.
CPC ............... *C08L 83/04* (2013.01); *C08K 5/01* (2013.01); *C09K 3/10* (2013.01); *H01B 7/00* (2013.01);
(Continued)

(58) Field of Classification Search
None
See application file for complete search history.

(56) References Cited

U.S. PATENT DOCUMENTS 4,162,243 A * 7/1979 Lee .......................... C08K 9/06
524/847
4,418,165 A * 11/1983 Polmanteer .............. G02B 1/04
523/107
(Continued)

FOREIGN PATENT DOCUMENTS

CN    105504826      *  4/2016  ............ C08L 83/04
DE    602 02 747 T2     6/2005
(Continued)

OTHER PUBLICATIONS

Machine translation of CN-105504826, translation generated Jul. 2020, 6 pages (Year: 2020).*
(Continued)

*Primary Examiner* — Robert S Loewe
(74) *Attorney, Agent, or Firm* — Oliff PLC

(57) ABSTRACT

A silicone rubber composition for waterproofing which is capable of maintaining waterproofing performance even if flexing and bending occur; a silicone rubber molded body for waterproofing; and a wire harness. This silicone rubber composition for waterproofing includes a thermosetting sili-
(Continued)

cone rubber, has a Shore A hardness of not more than 25 after being cured, and has breaking strength of at least 5.0 MPa after being cured. The silicone rubber composition for waterproofing is used in a waterproofing part of a wire harness. It is preferable that a vinyl group-containing compound be included in addition to the thermosetting silicone rubber. A vinyl group-containing compound may be a monofunctional vinyl group-containing compound.

9 Claims, 2 Drawing Sheets

(51) Int. Cl.
*C09K 3/10* (2006.01)
*H01B 7/00* (2006.01)
*H01B 7/282* (2006.01)

(52) U.S. Cl.
CPC ........ *H01B 7/282* (2013.01); *C08L 2203/202* (2013.01); *Y02A 30/14* (2018.01)

(56) References Cited

U.S. PATENT DOCUMENTS

| | | | | |
|---|---|---|---|---|
| 4,520,160 | A * | 5/1985 | Brown | A61K 8/06 524/765 |
| 5,290,885 | A * | 3/1994 | Vincent | C09J 183/04 525/478 |
| 5,563,211 | A * | 10/1996 | Kosal | C08K 9/06 524/731 |
| 2004/0132947 | A1* | 7/2004 | Achenbach | C08L 83/04 528/15 |
| 2004/0236054 | A1* | 11/2004 | George | C07F 15/0086 528/15 |
| 2006/0155074 | A1 | 7/2006 | Kudo et al. | |
| 2006/0258819 | A1* | 11/2006 | Woerner | C08L 83/04 525/477 |
| 2008/0114126 | A1* | 5/2008 | Blok | B29C 48/402 525/105 |
| 2008/0200609 | A1* | 8/2008 | Woerner | C08L 83/04 524/588 |
| 2008/0220266 | A1 | 9/2008 | Murai et al. | |
| 2008/0221264 | A1* | 9/2008 | Weidinger | C08L 83/04 524/588 |
| 2008/0284106 | A1 | 11/2008 | Maton et al. | |
| 2009/0005499 | A1* | 1/2009 | Fisher | C08J 5/18 524/588 |
| 2010/0200146 | A1* | 8/2010 | Zhu | B82Y 10/00 156/62.2 |
| 2011/0319510 | A1* | 12/2011 | Tsuchiyama | C08G 77/04 521/117 |
| 2012/0136108 | A1* | 5/2012 | Grunwald | C08L 83/04 524/495 |
| 2013/0011606 | A1 | 1/2013 | Otomo et al. | |
| 2013/0011617 | A1* | 1/2013 | Tasaki | C08K 3/22 428/148 |
| 2013/0323428 | A1* | 12/2013 | Ochs | C08L 83/04 427/331 |
| 2015/0000522 | A1* | 1/2015 | Ahn | B01D 63/08 95/52 |
| 2015/0083324 | A1* | 3/2015 | Stanjek | C08K 3/36 156/305 |
| 2016/0027552 | A1 | 1/2016 | Kuriyagawa et al. | |
| 2016/0194452 | A1* | 7/2016 | Sandmeyer | C09D 183/04 528/31 |
| 2016/0194455 | A1* | 7/2016 | Mateu | C08L 83/04 528/26 |
| 2016/0280918 | A1 | 9/2016 | Kumar et al. | |
| 2016/0369100 | A1* | 12/2016 | Kihara | C08K 9/06 |
| 2017/0081515 | A1* | 3/2017 | Kato | C08K 3/36 |
| 2017/0133121 | A1 | 5/2017 | Yu et al. | |
| 2017/0145272 | A1 | 5/2017 | Ooki | |

FOREIGN PATENT DOCUMENTS

| | | | | |
|---|---|---|---|---|
| DE | 699 30 078 T2 | | 10/2006 | |
| JP | 2007307757 A | * | 11/2007 | ............ B29C 35/02 |
| JP | 2012082262 A | | 4/2012 | |
| JP | 2012082309 A | | 4/2012 | |
| JP | 2012164433 A | | 8/2012 | |
| JP | 2013064090 A | * | 4/2013 | ............ C08L 83/04 |
| JP | 2015057763 A | | 3/2015 | |
| JP | 2015168748 A | | 9/2015 | |

OTHER PUBLICATIONS

Aug. 8, 2017 International Search Report issued in International Patent Application No. PCT/JP2017/017862.

* cited by examiner

SILICONE RUBBER COMPOSITION FOR WATERPROOFING, SILICONE RUBBER MOLDED BODY FOR WATERPROOFING, AND WIRE HARNESS

TECHNICAL FIELD

The present disclosure relates to a silicone rubber composition for waterproofing, a silicone rubber molded body for waterproofing and a wire harness, more specifically to a silicone rubber composition for waterproofing configured to be used in a waterproofing part of a wire harness, a silicone rubber molded body for waterproofing and the wire harness.

BACKGROUND ART

Among various automobile wire harnesses, some wire harnesses used outside a vehicle especially in an engine room may be exposed to water such as rainwater, in some cases. For this reason, in such types of wire harnesses, waterproofing treatment may be applied to a wire terminal, clearances between wires, inside a housing and the like.

CITATION LIST

Patent Literature

[Patent Document 1] Japanese Patent Application Laid-Open Publication No. 2003-308742
[Patent Document 2] Japanese Patent Application Laid-Open Publication No. 2012-164602

SUMMARY

Technical Problem

A wire harness when arranged may be flexed and bent, in some cases. When flexing and bending force is applied to a waterproofing part, waterproofing sealant may be peeled off from the waterproofing part, and thus the waterproofing performance thereof may be lowered.

The problem to be solved by the embodiments of the present disclosure is to provide a silicone rubber composition for waterproofing which is capable of enabling to maintaining waterproofing performance even if flexing and bending occur, a silicone rubber molded body for waterproofing, and a wire harness.

Solution to Problem

In order to solve the above-described problem, the silicone rubber composition for waterproofing according to some embodiments of the present disclosure is configured to be used in a waterproofing part of a wire harness, and to contain thermosetting silicone rubber and have Shore A hardness of not more than 25 after being cured and breaking strength of at least 5.0 MPa after being cured.

It is preferable that a vinyl group-containing compound be contained in addition to the thermosetting silicone rubber. The vinyl group-containing compound is preferably a monofunctional vinyl group-containing compound. A molar ratio (a:b) between a vinyl group (a) of the vinyl group-containing compound and a hydrosilyl group (b) in the thermosetting silicone rubber is preferably in a range between 10:1 and 0.2:1.

The silicone rubber molded body for waterproofing according to some embodiments of the present disclosure is configured by a cured product of the silicone rubber composition for waterproofing.

A wire harness according to some embodiments of the present disclosure is configured to include a waterproofing part, and the silicone rubber molded body for waterproofing is configured to be disposed in the waterproofing part of the wire harness.

Advantageous Effects

The silicone rubber composition for waterproofing according to some embodiments of the present disclosure contains thermosetting silicone rubber, and has Shore A hardness of not more than 25 after being cured and breaking strength of at least 5.0 MPa after being cured, thereby enabling to maintain waterproofing performance even if flexing and bending occur when the silicone rubber composition for waterproofing is used in the waterproofing part of the wire harness. Further, the silicone rubber molded body for waterproofing according to some embodiments of the present disclosure and the wire harness including the silicone rubber molded body for waterproofing according to some embodiments of the present disclosure enable to maintain waterproofing performance even if flexing and bending occur.

DESCRIPTION OF EMBODIMENTS

Figure 1:
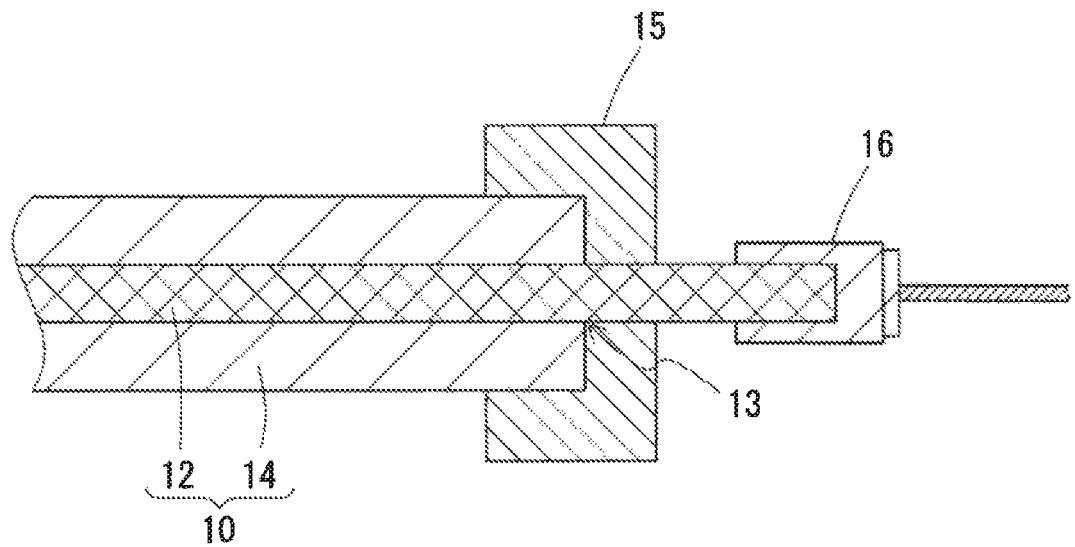
FIG. 1 is a sectional view of a wire harness with a wire terminal subjected to waterproofing treatment, according to one embodiment of the present disclosure.

Some embodiments of the present disclosure will be described below in detail.

The silicone rubber composition for waterproofing according to some embodiments of the present disclosure (hereinafter, also referred to as the targeted composition) to be used in a waterproofing part of a wire harness, contains thermosetting silicone rubber, and has Shore A hardness of not more than 25 after being cured and breaking strength of at least 5.0 MPa after being cured.

The thermosetting silicone rubber, which is addition reaction type (addition curable type) silicone rubber, contains alkenyl group-containing organopolysiloxane as a main component and hydrosilyl group-containing organopolysiloxane as a curing agent. The thermosetting silicone rubber further contains a platinum catalyst as a crosslinking catalyst. Examples of the alkenyl group include a vinyl group, an allyl group, a butenyl group and a pentenyl group. The organopolysiloxane has a polysiloxane chain (—Si—O—Si—O—) as a main chain and an organic group on Si. Examples of the organic group of the organopolysiloxane include a methyl group, an ethyl group and a phenyl group.

The targeted composition has Shore A hardness of not more than 25 after being cured, thereby providing excellent flexibility. Even if flexing and bending occur when the targeted composition is used in the waterproofing part of the wire harness, the targeted composition thus enables to suppress defects such as cracks and clearances from occurring in the waterproofing part. This enables the maintaining of the waterproofing performance. Shore A hardness is measured in accordance with JIS K6253. Shore A hardness after being cured is more preferably not more than 23, further preferably not more than 20. Moreover, Shore A hardness after being cured is preferably at least 15 from the viewpoint of securing strength and the like, more preferably at least 18. Proper strength is secured, thereby enabling suppression of defects such as cracks and clearances from occurring in the waterproofing part, even if flexing and bending occur when the targeted composition is used in the waterproofing part of the wire harness.

The targeted composition has breaking strength of at least 5.0 MPa after being cured, thereby enabling to suppress defects such as cracks and clearances from occurring in the waterproofing part, even if flexing and bending occur when the targeted composition is used in the waterproofing part of the wire harness. Breaking strength is measured in accordance with JIS K6252. Breaking strength after being cured is preferably at least 5.3 MPa, more preferably at least 7.0 MPa, further preferably at least 7.5 MPa. Moreover, breaking strength after being cured is preferably not more than 10.5 MPa. Flexibility is easily secured in the case of breaking strength of not more than 10.5 MPa after being cured. Breaking strength after being cured is more preferably not more than 10.1 MPa, further preferably not more than 9.5 MPa.

Shore A hardness after being cured and breaking strength after being cured of the targeted composition are affected by the composition of the thermosetting silicone rubber. It is difficult to provide the targeted composition having such low Shore A hardness within the above-described range only by adjustment of the compounding ratio between the main component and the curing agent. In some embodiments of the present disclosure, a method of reducing the crosslinking points of the silicone rubber is executed to lower Shore A hardness after being cured as compared with normal thermosetting silicone rubber. Consequently, breaking strength after being cured is also lowered. Examples of the method of reducing the crosslinking points include a method of compounding or blending a vinyl group-containing compound together with the thermosetting silicone rubber. The vinyl group-containing compound referred to here may be added to the thermosetting silicone rubber, excluding the vinyl group-containing organopolysiloxane contained in the thermosetting silicone rubber.

Although the vinyl group-containing compound is not limited particularly, the vinyl group-containing compound is more preferably a monofunctional vinyl group-containing compound than a polyfunctional vinyl group-containing compound from the viewpoint of easiness in reducing crosslinking points. The polyfunctional vinyl group containing compound herein has a plurality of vinyl groups in one molecule, while the monofunctional vinyl group-containing compound herein has one vinyl group in one molecule. Examples of the vinyl group-containing compound include 1-alkene (alkene having a terminal double bond).

The content of the vinyl group-containing compound is preferably set on the basis of the mole number of the vinyl group. The molar ratio (a:b) between the vinyl group (a) of the vinyl group-containing compound and the hydrosilyl group (b) in the thermosetting silicone rubber is preferably in the range between 10:1 and 0.2:1, more preferably between 3:1 and 0.2:1. As the vinyl group (a) is relatively increased, the effect of reducing the crosslinking points is improved and the flexibility is improved. As the vinyl group (b) is relatively decreased, the crosslinking points are secured and the strength is improved.

From the viewpoint of flexibility, the targeted composition preferably has breaking elongation of at least 650% as physical property after being cured, more preferably at least 700%. Moreover, the targeted composition preferably has crosslinking density of not more than $4.0 \times 10^{-4}$ mol/cc. From the viewpoint of strength, the targeted composition preferably has breaking elongation of not more than 900% as physical property after being cured. Moreover, the targeted composition preferably has crosslinking density of at least $2.5 \times 10^{-4}$ mol/cc. Breaking elongation is measured in accordance with JIS K6252. Crosslinking density is able to be calculated from the measurement result of the dynamic viscoelasticity thereof. The targeted composition is preferably liquid at room temperature, from the viewpoints of easiness in application to a desired position and easiness in obtaining flexibility.

The silicone rubber molded body for waterproofing according to some embodiments of the present disclosure (hereinafter, also referred to as "targeted molded body") obtained by use of the targeted composition includes a cured product of the targeted composition. The targeted molded body to be used in the waterproofing part of the wire harness may be obtained in such a manner that the targeted composition is disposed in the waterproofing part of the wire harness and then cured, or may be obtained in such a manner that the targeted composition is molded in a predetermined shape and then disposed in the waterproofing part of the wire harness. Examples of the molded body by the latter manner include a rubber stopper which is molded into a cylindrical shape in advance.

Waterproofing treatment is applied to the waterproofing part of the wire harness by use of the targeted composition or the targeted molded body. In the wire harness according to some embodiments of the present disclosure, the targeted molded body is disposed in the waterproofing part of the wire harness. The wire harness has at least one insulated wire. The insulated wire has a conductor and coating material coating the outer periphery of the conductor. The wire terminal of the insulated wire of the wire harness is connected to a connection terminal. The wire terminal is housed in a housing (connector housing).

Examples of the waterproofing part of the wire harness include the waterproofing part disposed between the coating material and the conductor at the wire terminal of the insulated wire included in the wire harness, the waterproofing part disposed between the coating materials of the plurality of insulated wires included in the wire harness, and the waterproofing part disposed between the housing and the insulated wire included in the wire harness.

Figure 2:
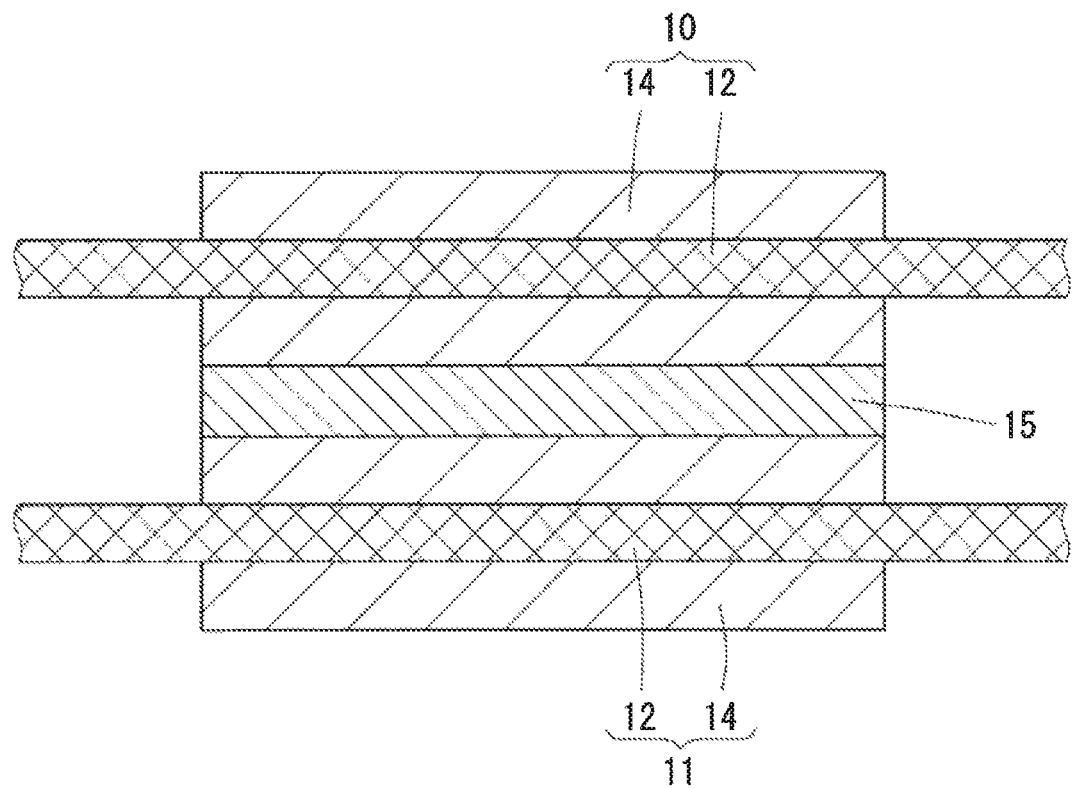
FIG. 2 is a sectional view of a wire harness with a clearance between the wires thereof subjected to waterproofing treatment, according to one embodiment of the present disclosure.
Figure 3:
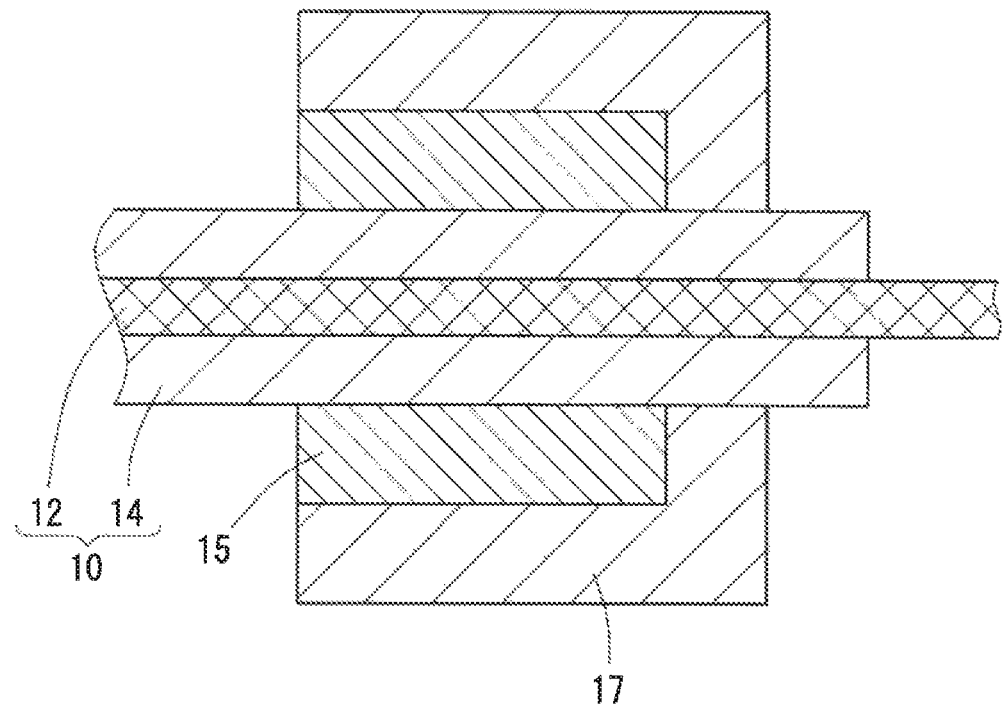
FIG. 3 is a sectional view of a wire harness with the inside of a housing subjected to waterproofing treatment, according to one embodiment of the present disclosure.

FIG. 1 shows the wire harness with the wire terminal subjected to the waterproofing treatment, according to one embodiment of the present disclosure. FIG. 2 shows the wire harness with the clearance between the wires subjected to the waterproofing treatment, according to one embodiment of the present disclosure. FIG. 3 shows the wire harness with the inside of the housing subjected to the waterproofing treatment, according to one embodiment of the present disclosure.

In FIG. 1, in an insulated wire 10 included in the wire harness, a coating material 14 at the wire terminal is peeled off so that a conductor 12 is exposed partially. A terminal metal fitting 16 is connected to the terminal of the exposed conductor 12. Since the conductor 12 is exposed partially at the wire terminal, water may penetrate inside the wire from a clearance 13 generated between the coating material 14 and the conductor 12. In the wire harness to be disposed at a place having a possibility to be exposed to water, the wire terminal needs to be subjected to the waterproofing treatment. In FIG. 1, the wire terminal is subjected to the waterproofing treatment in such a manner that the targeted composition is disposed so as to close the clearance generated between the exposed conductor 12 and the coating material 14, and then cured. As a result, a silicone rubber molded body for waterproofing 15 is disposed in the waterproofing part of the wire harness.

In FIG. 2, the wire harness includes a plurality of insulated wires 10, 11. In the wire harness to be disposed at a place having a possibility to be exposed to water, water may penetrate from the clearance generated between the coating materials 14, 14 of the plurality of insulated wires 10, 11. Therefore, in FIG. 2, the waterproofing treatment is applied in such a manner that the targeted composition is disposed so as to close the clearance between the coating materials 14, 14 of the plurality of insulated wires 10, 11, and then cured. As a result, the silicone rubber molded body for waterproofing 15 is disposed in the waterproofing part of the wire harness.

In FIG. 3, the wire terminal of the insulated wire 10 included in the wire harness is housed in a housing (connector housing) 17. In the wire harness to be disposed at a place having a possibility to be exposed to water, water may penetrate from the clearance generated between the insulated wire 10 and the housing 17. Therefore, in FIG. 3, the waterproofing treatment is applied in such a manner that the targeted composition is disposed so as to close the clearance generated between the insulated wire 10 and the housing 17, and then cured. As a result, the silicone rubber molded body for waterproofing 15 is disposed in the waterproofing part of the wire harness.

The material of the coating material 14 of the insulated wire is not limited particularly. The material of the coating material 14 may be insulating resin material or the like. Examples of the insulating resin material include vinyl chloride resin, olefin resin and silicone rubber. The insulating resin material may contain additives to be added to the coating material. Examples of the additives include flame retardant and antioxidant.

The conductor 12 may be configured by a single wire, or may be configured by a plurality of strands. Such single wire or such plurality of strands include one or more types selected from metal strands and/or organic fiber. Copper, copper alloy, aluminum, and aluminum alloy which have excellent conductivity are used as the metal strands. Stainless steel or the like may be used as a reinforcing wire (tension member). Conductive organic fiber or nonconductive organic fiber is used as the organic fiber. The conductive organic fiber may be of conductive fiber containing conductive filler inside the fiber, or may be of conductive fiber having a metal layer coating the outer periphery of the organic fiber. The nonconductive organic fiber may be used as a reinforcing wire (tension member). The plurality of strands may be formed by being stranded, or may be formed without being stranded.

EXAMPLES

Examples and comparative examples are described below.

Examples 1 to 5

<Preparation of Silicone Rubber Composition>

Thermosetting silicone rubber and a vinyl group-containing compound are compounded according to the compounding quantities (pts.mass) indicated in Table 1, and mixed by a mixer for 60 minutes in the atmosphere at room temperature, whereby a silicone rubber composition is obtained.

Thermosetting silicone rubber: "7-6840A" and "7-6840B" made by Dow Corning Toray Co., Ltd.

Vinyl group-containing compound: 1-dodecene

<Formation of Cured Product of Silicone Rubber>

The obtained silicone rubber composition is subjected to press molding in a press frame under the conditions of 180° C. and 10 MPa for 1 minute, whereby a plate-like (200 mm×200 mm×2 mm) cured product of silicone rubber is formed.

<Waterproofing Treatment to Wire Terminal>

The coating material of the terminal of a PVC coated wire is peeled off so that the conductor is exposed, and the silicone rubber composition is disposed so as to close the clearance generated between the exposed conductor and the coating material as shown in FIG. 1, and then thermoset. In this manner, the waterproofing treatment is applied to the wire terminal.

Comparative Examples 1 to 5

<Preparation of Silicone Rubber Composition>

Thermosetting silicone rubber is compounded according to the compounding quantities (pts.mass) indicated in Table 2, and mixed by a mixer for 60 minutes in the atmosphere at room temperature, whereby a silicone rubber composition is obtained. No vinyl group-containing compound is compounded.

<Formation of Cured Product of Silicone Rubber>

A cured product of silicone rubber is formed in the same manner as in the examples.

<Waterproofing Treatment to Wire Terminal>

The waterproofing treatment is applied to the wire terminal as in the examples.

(Breaking Elongation, Breaking Strength)

The obtained plate-like cured product of silicone rubber is punched as a No. 3 dumbbell in accordance with JIS K6252, and the elastic moduluses (breaking elongation, breaking strength) are measured.

(Crosslinking Density)

The obtained plate-like cured product of silicone rubber is punched into the size of 10 mm×5 mm×2 mm, and the dynamic viscoelasticity thereof is measured to calculate the crosslinking density on the basis of the measurement result.

(Shore A Hardness)

The Shore A hardness of the obtained plate-like cured product of silicone rubber is measured in accordance with JIS K6253.

(Air Leak Test)

Figure 4:
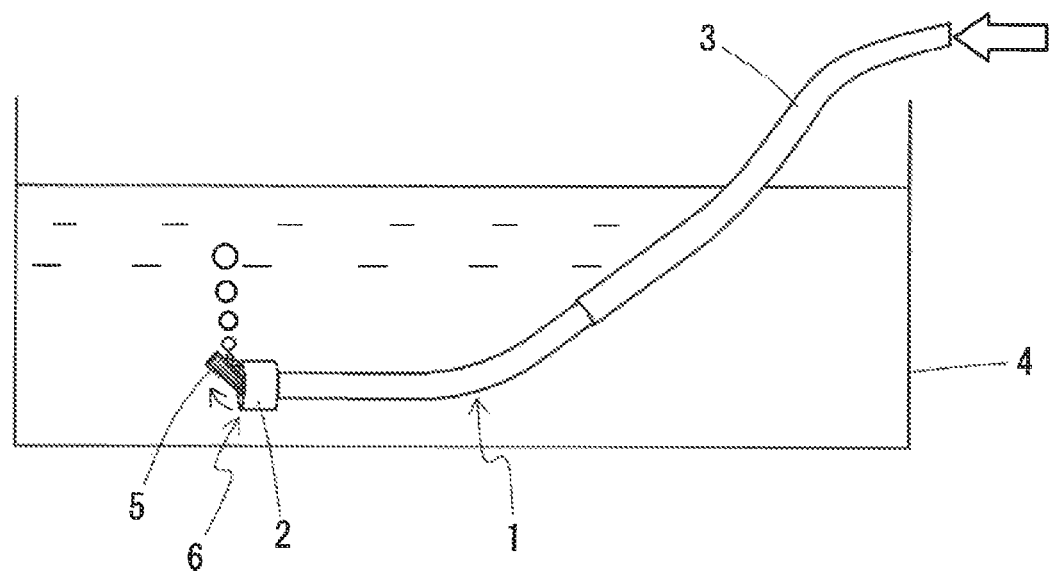
FIG. 4 is an explanatory view of a method of evaluating waterproofing performance.

As shown in FIG. 4, a rubber tube 3 is inserted into the end portion of an insulated wire 1 with the wire terminal subjected to the waterproofing treatment by use of a cured silicone rubber product 2, and the entire insulated wire 1 is entered into a water tank 4. Air pressure is applied through the rubber tube 3 to the insulated wire 1 in the state where a conductor 5 is flexed toward the direction indicated by the arrow so that force is applied to a waterproofing part 6. In the case where no air leaks from the waterproofing part 6 while the air pressure of 200 kPa is applied for 30 seconds, the waterproofing performance thereof is determined as "Good." In the case where air leaks, the waterproofing performance is determined as "Poor." Moreover, in the case where no air leaks from the waterproofing part 6 while the air pressure of 300 kPa is applied for 30 seconds, the waterproofing performance is determined as "Excellent."

TABLE 1

|  | Examples | | | | |
| --- | --- | --- | --- | --- | --- |
|  | 1 | 2 | 3 | 4 | 5 |
| Thermosetting silicone rubber 7-6840A (pts · mass) | 50 | 50 | 50 | 20 | 80 |
| Thermosetting silicone rubber 7-6840B (pts · mass) | 50 | 50 | 50 | 80 | 20 |
| Vinyl group-containing compound (pts · mass) | 504 | 168 | 14 | 14 | 14 |
| Vinyl group:Hydrosilyl group (molar ratio) | 10:1 | 3:1 | 0.3:1 | 0.7:1 | 0.2:1 |
| Breaking elongation (%) | 890 | 800 | 770 | 660 | 680 |
| Breaking strength (MPa) | 5.3 | 7.5 | 10.1 | 9.2 | 8.9 |
| Crosslinking density (mol/cc) | $2.98 \times 10^{-4}$ | $3.36 \times 10^{-4}$ | $3.88 \times 10^{-4}$ | $3.74 \times 10^{-4}$ | $3.81 \times 10^{-4}$ |
| Shore A hardness | 15 | 18 | 25 | 24 | 25 |
| Air leak test (200 kPa, 300 kPa) | Excellent | Excellent | Excellent | Excellent | Excellent |

TABLE 2

|  | Comparative Examples | | | | |
| --- | --- | --- | --- | --- | --- |
|  | 1 | 2 | 3 | 4 | 5 |
| Thermosetting silicone rubber 7-6840A (pts · mass) | 50 | 20 | 30 | 80 | 70 |
| Thermosetting silicone rubber 7-6840B (pts · mass) | 50 | 80 | 70 | 20 | 30 |
| Vinyl group-containing compound (pts · mass) | 0 | 0 | 0 | 0 | 0 |
| Vinyl group:Hydrosilyl group (molar ratio) | — | — | — | — | — |
| Breaking elongation (%) | 600 | 410 | 440 | 380 | 480 |
| Breaking strength (MPa) | 12.4 | 14.5 | 12.9 | 15.2 | 13.5 |
| Crosslinking density (mol/cc) | $4.28 \times 10^{-4}$ | $4.98 \times 10^{-4}$ | $4.60 \times 10^{-4}$ | $4.81 \times 10^{-4}$ | $4.47 \times 10^{-4}$ |
| Shore A hardness | 30 | 28 | 30 | 28 | 30 |
| Air leak test (200 kPa, 300 kPa) | Poor | Poor | Poor | Poor | Poor |

In each of the comparative examples 1 to 5, the silicone rubber for waterproofing has poor flexibility. When each of the comparative examples is flexed so that force is applied to the waterproofing part 6, the waterproofing performance is lowered and determined as insufficient according to the result of the air leak test. On the other hand, in each of the examples 1 to 5, the silicone rubber for waterproofing has sufficient flexibility and strength. Even when each of the examples is flexed so that force is applied to the waterproofing part 6, the waterproofing performance is maintained and determined as sufficient according to the result of the air leak test.

Although the embodiments of the present invention have been described in detail so far, the present invention is not limited to the above-described embodiments. Various modifications are available without departing from the gist of the present invention.

REFERENCE SIGNS LIST

10, 11 INSULATED WIRE
12 CONDUCTOR
14 COATING MATERIAL
15 SILICONE RUBBER MOLDED BODY FOR WATERPROOFING

The invention claimed is:

1. A silicone rubber composition for waterproofing configured to be used in a waterproofing part of a wire harness, the silicone rubber composition for waterproofing containing:
   a vinyl group-containing compound, and
   a thermosetting silicone rubber,
   the silicone rubber composition having a Shore A hardness of not more than 20 after being cured and a breaking strength of at least 7.5 MPa but not more than 10.5 MPa after being cured, wherein
   a molar ratio (a:b) between a vinyl group (a) of the vinyl group-containing compound and a hydrosilyl group (b) in the thermosetting silicone rubber is in a range between 10:1 and 0.2:1.

2. The silicone rubber composition for waterproofing according to claim 1, wherein
   the vinyl group-containing compound is a monofunctional vinyl group-containing compound.

3. The silicone rubber composition for waterproofing according to claim 2, wherein
   the vinyl group-containing compound is a 1-alkene.

4. A silicone rubber molded body for waterproofing configured by a cured product of the silicone rubber composition for waterproofing according to claim 3.

5. A wire harness comprising a waterproofing part, wherein
   the silicone rubber molded body for waterproofing according to claim 4 is disposed in the waterproofing part.

6. A silicone rubber molded body for waterproofing configured by a cured product of the silicone rubber composition for waterproofing according to claim 2.

7. A silicone rubber molded body for waterproofing configured by a cured product of the silicone rubber composition for waterproofing according to claim 1.

8. A wire harness comprising a waterproofing part, wherein
a silicone rubber molded body for waterproofing is disposed in the waterproofing part; the silicone rubber molded body for waterproofing configured by a cured product of a silicone rubber composition for waterproofing, the silicone rubber composition for waterproofing containing:
a vinyl group-containing compound, the vinyl group-containing compound being a monofunctional vinyl group-containing compound, and
a thermosetting silicone rubber,
the silicone rubber composition having a Shore A hardness of not more than 25 after being cured and a breaking strength of at least 7.5 MPa but not more than 10.5 MPa after being cured, wherein
a molar ratio (a:b) between a vinyl group (a) of the vinyl group-containing compound and a hydrosilyl group (b) in the thermosetting silicone rubber is in a range between 10:1 and 0.2:1.

9. A wire harness comprising a waterproofing part, wherein
a silicone rubber molded body for waterproofing is disposed in the waterproofing part; the silicone rubber molded body for waterproofing configured by a cured product of a silicone rubber composition for waterproofing, the silicone rubber composition for waterproofing containing:
a vinyl group-containing compound, and
a thermosetting silicone rubber,
the silicone rubber composition having a Shore A hardness of not more than 25 after being cured and a breaking strength of at least 7.5 MPa but not more than 10.5 MPa after being cured, wherein
a molar ratio (a:b) between a vinyl group (a) of the vinyl group-containing compound and a hydrosilyl group (b) in the thermosetting silicone rubber is in a range between 10:1 and 0.2:1.

\* \* \* \* \*